United States Patent Office 3,223,460
Patented Dec. 14, 1965

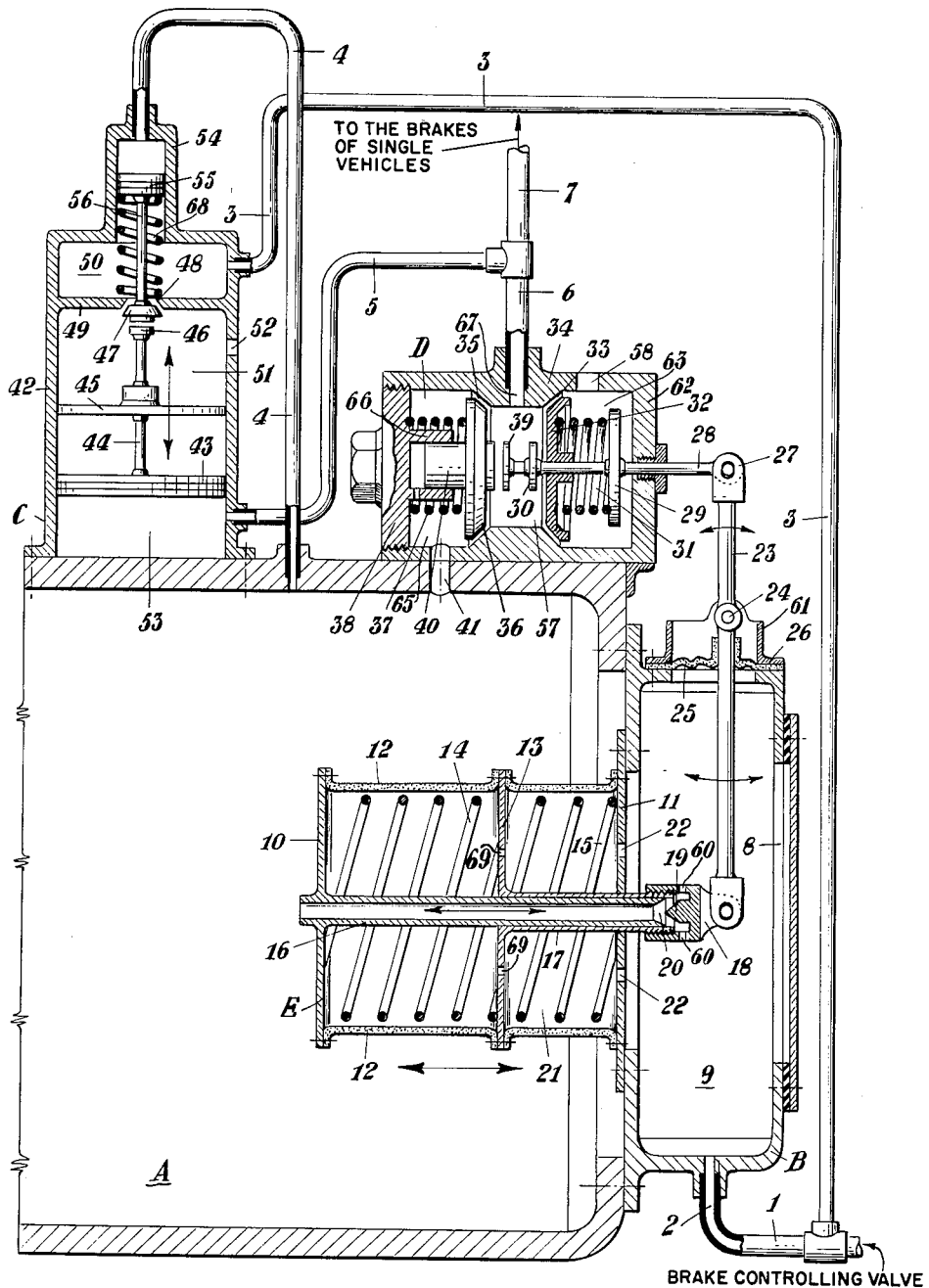

3,223,460
AUTOMATIC BRAKE VALVE INCLUDING QUICK SERVICE MEANS
Nicolas Osvaldo Spagnolo, 922 Avenida Corrientes, Buenos Aires, Argentina
Filed Mar. 30, 1962, Ser. No. 183,921
2 Claims. (Cl. 303—38)

The present invention relates to a braking system for vehicles trailed in series, wherein a single collective control is carried out from a driving vehicle.

It is known that in the actual braking system of vehicles, wagons, cars, trucks and trailers coupled in series, the braking and brake releasing operations are embodied in cascade, i.e. starting from the single control, the braking and brake releasing action being performed in each vehicle in its sequence order, one at a time. This effect does not correspond to the action of the driver, as the operative system implies greater braking time and space, compressive and/or tractive stresses exerted on corresponding members of the vehicles and thus sudden decelerations and/or accelerations of loads and passengers. Summarizing, all these drawbacks give rise to quick wear of the bumpers between the vehicles, annoyances and disturbances of passengers and damages or dangerous displacements of loads.

An object of this invention is to provide a braking system wherein the braking or brake releasing operation is performed simultaneously and instantaneously in all the vehicles coupled in series and to avoid the above disadvantages.

Another object of the invention is to provide a braking system which is safe, effective, simple and economical so as to increase the performance of the system and decrease the maintenance and replacing costs.

A braking system according to the invention is illustrated diagrammatically by way of example in the drawing.

As shown in the drawing, the system comprises a tank A containing compressed air, a pressure control unit B, a movable spring valve E connecting said tank with said pressure control unit B, an accelerating valve unit C which accelerates the braking and brake releasing operation and a brake control unit D which directly operates the brakes at the wheels of each vehicle.

The four units A, B, C and D are interconnected as follows: a pipe 1 coming from the control member located in front of the driver in the cabin of the trailing vehicle, is connected, through a fitting 2 to the pressure control unit B, and by a pipe 3 to the accelerating valve unit C. The latter is connected by a pipe 4 to the compressed air reservoir A, by a duct 5 to the brake control unit D, and by pipe 6 and 7 to the braking members of the various vehicles.

The unit B consists of a container 8 having a chamber 9 connected at one of its side walls to the reservoir A. A spring valve E in the reservoir A connects the chamber 9 with the reservoir. The spring valve E consists of a hollow cylinder closed at its ends by two circular plates 10 and 11 and its elastically deformable side wall 12 is divided by a diaphragm 13 floating between two coil springs 14 and 15, said springs exerting their actions at one end against the diaphragm 13, while their other ends rest against the plates 10 and 11 respectively. The first plate 10 has at its center a circular bore wherein a first tubular element 16 is rigidly fixed with one end slightly projecting into tank A. The diaphragm 13 has a central bore to which is rigidly fastened a second tubular element 17 projecting towards the unit B. Bores 69 are provided in the diaphragm 13 for allowing the passage of air entering through the bores 22 into the spring valve E. The second plate 11 has a central bore in which said second tubular element slides. The first tubular element 16 telescopes within the second tubular element 17 thereby telescopically coupling elements 16 and 17 with one another.

The second plate 11 is rigidly connected to the container 8 and tightly closes an opening provided in its side wall which is rigidly fastened to the tank thereby tightly closing an opening in the adjacent wall of the tank.

A valve head 18 having an inner thread is screwed on an outer thread at the end of the second tubular element 17 within the chamber 9. The valve head 18 has an inner plug 19 which cooperates with a seat 20 formed at the end of the first tubular element 16 slidably arranged within the second tubular element 17.

The valve head 18 has a series of bores 60 provided around its side wall allowing the transfer of compressed air from the tank A to the chamber 9.

The valve chamber 21, formed by the diaphragm 13, plate 11 and side wall 12, communicates with the chamber 9 through a series of holes 22 in the plate 11.

A rocking lever 23 is pivoted at its lower end to the valve head 18 and at an intermediate point 24 to a top portion 61 of the container 8. The rocking lever 23 passes through a corrugated elastic member 25 tightly arranged between the top portion 61 and the upper wall of the container 8 for preventing air leakage.

On the upper wall of the tank A there is rigidly fastened the valve unit C consisting of a cylindrical casing 42 having a cylindrical projection 54 at the top which is connected by the pipe 4 with the tank A. A first piston 43 is arranged within the casing 42 and has a first stem 44 carrying at an intermediate point a disk shaped element 45 for guiding the piston 43 within cylindrical casing 42. A second piston 55 is arranged in the cylindrical projection 54 and has a stem 56 extending downwardly and passing through a bore 48 in a forward partition 49. At the end of the stem 56 a truncated cone shaped sealing element 47 is provided for sealingly engaging the bore 48 having a corresponding truncated cone shape. A spring 68 maintains the element 47 closed.

The partition 49 and the disk shaped element 45 divides the cylindrical casing 42 into an upper chamber 50 between the piston 55 and the partition 49, an intermediate chamber 51 between the partition 49 and the element 45 and a lower chamber 53 between the piston 43 and the bottom of the cylindrical casing 42. The upper chamber 50 is connected by the pipes 3 and 1 with the chamber 9. The second intermediate chamber 51 communicates through a hole 52 in the casing wall with the atmosphere and the third lower chamber 53 is connected through the pipes 5 and 6 with the unit D. At the upper end of the stem 44 a disk 46 is provided facing the sealing element 47 in the second chamber 51.

The pressure control unit D consists of a horizontal cylinder 62 fixed to the upper wall of the tank A and communicating therewith through coaxial bores 41 provided in the bottom of cylinder 62 and in the upper wall of the tank A.

The cylinder 62 is divided by an annular partition 34 into a right hand chamber 63, a central chamber 57 and a left hand chamber 65. A rod 28 is arranged coaxially in the chamber 63 and projects at one end through a side wall of the horizontal cylinder 62 outwardly towards the rocking lever 23 and is pivotally connected with the end of said lever, whereas the other end of rod 28 projects into chamber 57 and carries two disks 30 and 39. Chamber 63 is delimited by a side wall of cylinder 62 and by a floating valve disc 32 carried by the rod 28 engaging a corresponding annular valve seat 33 upon partition 34. A coil spring 31 engages at one end the valve disc 32 and at the other end a thrust disk 29 fixed to the rod 28.

The left hand chamber 65 is closed at one end by a disc shaped bottom 38 screwed with its outer thread within a terminal inner thread of cylinder 62, and at the other end by the valve disc 36 engaging a corresponding annular valve seat 35 upon partition 34. The valve disc 36 has a stem 40 slidably arranged at one end in an annular projection 66 of the bottom 38, around which a coil spring 37 is arranged, one end of which contacts the bottom 38 and the other end the valve member 36.

The stem 40 protrudes at its other end into the central chamber 57 and cooperates with the disc 39 at the end of the rod 28.

In the top of the right hand chamber 63 a vent bore 58 is provided, which communicates with the atmosphere. The central chamber 57 is connected with the pipe 6 by a bore 67 provided in the partition 34.

The operation is as follows:

Braking operation

When the operator opens the control valve located in the driving cabin, an air depression will be generated within the pipes 1, 2, chamber 9, pipe 3 and chamber 50. Consequently, the pressure of the compressed air within the tank A will exert an action on the plate 10 which will be displaced together with the tubular element 16 towards the valve head 18, until the valve plug 19 sealingly engages its seat 20 at the end of tubular element 16. Thus, communication between the tank A and the chamber 9 will be instantaneously interrupted, since the compressed air cannot flow through the valve bores 60 to the chamber 9.

The action of the compressed air continues by displacing also diaphragm 13 together with its tubular element 17 towards the chamber 9, causing thus the rocking lever 23 to swing counterclockwise. This movement causes in turn the rod 28 to exert a thrust on the coil spring 31 by thrust disc 29 and to close the valve 32 and to open the valve 36 by the thrust action of the disc 39 on the projecting end of the stem 40, which compresses coil spring 37. Thus, compressed air passes through the bore 41 into the chamber 65 and through the valve 36, now open, into the central chamber 57 and through the pipes 6 and 7 the compressed air reaches the brakes of the various vehicles. Simultaneously, through the duct 5 compressed air enters the lower chamber 53 of the unit C and pushes upwardly the piston 43, which causes valve 47 to close, interrupting thus the communication between the upper chamber 50 and the atmosphere through bore 52 and rendering instantaneously the effect of the compressed air coming from the tank A to the brakes of each vehicle.

It is to be noted that the difference of the sectional areas of the pistons 43 and 55 allows the valve 47 to be shut off notwithstanding the fact that both pistons are subjected to the pressure of the air from tank A.

Brake releasing operation

For the brake releasing operation, the operator closes the control valve establishing thus the pressure equilibrium in pipes 1, 2 chamber 9, pipe 3 and chamber 50. The springs 14 and 15 expand thus opening the valve 19.

The compressed air enters the chamber 9 and through the bores 22 of the plate 11 into the chamber 21 of the unit E causing thus the lever 23 to move clockwise, opening the valve 32. Consequently, the end disc 29 will not exert a thrust on the stem 40 and the coil spring 37 causes the valve 36 to close interrupting thus the flow of compressed air from the tank A through the bores 41 and the pipes 6 and 7. The air pressure in the brakes of each vehicle discharges through the pipes 6 and 7, valve 32 and bore 58 to the atmosphere.

Simultaneously, the pressure of the compressed air acting on the piston 55, opens the valve 47, pushes down the piston 43 and the compressed air in the chamber 53 discharges through the pipes 5 and 6, valve 32 and vent bore 58 to the atmosphere.

Obviously the described braking and brake releasing operations may be carried out abruptly, gradually or alternately in accordance with the circumstances at which such operations are to be performed.

Having thus described the constructional features and operations of the braking device according to this invention, it is understood that certain changes and modifications may be made by the skilled in the art without departing from the spirit of the following claims.

I claim:
1. A braking system for vehicles trailed in series with a brake control valve for simultaneously and instantaneously controlling the braking and brake releasing operations in the brakes of all the vehicles, comprising a compressed air tank, a pressure controlling unit comprising a container, a first pipe connecting said container with said brake control valve, a movable spring valve connecting said tank with said container for shutting off the air passage from the tank to the container comprising an elastically deformable hollow cylinder, a first circular plate and a second cylindrical plate closing the open ends of said deformable cylinder respectively, said second plate closing an opening provided in the side wall of the container and being rigidly fastened thereto, a diaphragm dividing said deformable cylinder in two valve chambers, two coil springs arranged in said valve chambers respectively to rest at one end on one of said plates respectively and at the other ends on the opposite sides of said diaphragm, a first tubular element rigidly fastened in a central bore of said first plate and passing through central bores provided in said diaphragm and said second plate, a second tubular element rigidly fastened to said diaphragm around said first tubular element, said second tubular element being in tight and slidable relation with the central bore in said second plate and with said first tubular element, said tubular elements projecting into said container through an opening provided in the side wall of the tank, said container and tank being rigidly connected with one another at their openings, a valve head screwed on the end of said second tubular element and having an inner valve plug engageable with a valve seat provided at the end of said first tubular element and a series of bores provided in its side wall for allowing the passage of the compressed air from the tank to the container, whereby at a subpressure caused in said container by operating said brake controlling valve the air pressure in the tank will cause said first plate to displace said first tubular element for engaging its valve seat with said valve plug and shutting off the communication between said tank and said container and the successive action of the air pressure displaces also the second tubular element together with said valve head mechanically connected to said brake control unit, a series of bores being provided in said second plate for allowing the outflow of the air from said second valve chamber at the displacement of said second tubular element, a brake control unit connected with said tank through an air passage duct and with the atmosphere through a vent bore and mechanically coupled to said spring valve for controlling the inflow and outflow of the compressed air into and from the brakes of the vehicles, a second pipe connecting said brake control unit with the brakes of the vehicles; an accelerating valve unit for accelerating the braking operation, a third pipe, a fourth pipe and a fifth pipe connecting said accelerating valve unit respectively with said tank, first pipe and second pipe, said accelerating valve unit comprising a cylindrical casing fixed on the upper wall of said tank and having a cylindrical projection connected at its top through said third pipe to said tank, a first piston arranged in said casing and having a first piston stem protruding upwardly in said casing, a disc shaped element rigidly fastened to said piston stem for guiding said piston in said casing, a terminal disc forming the end of said first stem, a horizontal partition provided in said casing beneath said cylindrical projection, a second piston arranged in said projection and having a second piston stem protruding downwardly into said cylindrical casing through a central cone shaped bore in said partition, a spring valve arranged around said second piston stem and abutting at its ends on said horizontal partition and said second piston, a truncated cone shaped sealing element secured to the end of said second stem beneath said partition, said partition and first piston dividing said casing into an upper chamber formed between the top of said cylindrical projection and said partition and connected with said first pipe through said fourth pipe, an intermediate chamber formed between said partition and said first piston and communicating with the atmosphere through a vent bore in the wall of said casing, and a lower chamber formed between said first piston and the bottom of the casing and connected with said second pipe through said fifth pipe, whereby the compressed air entering in the lower chamber from said brake control unit through said fifth pipe causes the first piston to displace upwardly to close the cone shaped bore in the partition, whereby at a subpressure generated by the brake control valve in said fourth pipe the braking operation will be accelerated by the opening of said sealing element and discharge of the compressed air into the atmosphere through said vent bore in the wall of the accelerating valve casing and successively owing to the subpressure generated in said container said spring valve will be closed by the action of the air pressure in the tank and displaced for operating said brake control unit to cause the compressed air to flow into said control unit through said air package duct and then through said second pipe to the brakes and to shut off communication with the atmosphere through said vent bore.

2. A brake system as claimed in claim 1 wherein said brake control unit comprises a horizontal cylinder fixed to the upper wall of said tank, said cylinder being divided by a central partition into a right hand chamber, a left hand chamber and a central chamber formed by said partition, a rod arranged in coaxial relation to said cylinder within said right hand chamber and projecting outwardly at one end through a central bore provided in the side wall of said cylinder, a disc secured to the other end of said rod projecting into said central chamber, a first valve disc arranged on said rod within said right hand chamber, a thrust disc rigidly fastened to said rod between said first valve disk and side wall of said cylinder, a first coil spring placed around said rod to rest at one end on said first valve disc and at the other end on said thrust disc, said first valve disc cooperating with a first valve seat on said partition, a disc shaped bottom screwed with its outer thread within an inner thread of said cylinder and having a central annular projection protruding into said left hand chamber, a second coil spring arranged around said annular projection, a stem inserted in said annular projection, a second valve disc rigidly connected with said stem and resting on said second coil spring, said second valve disc cooperating with a second valve seat provided on said partition for opening and closing said left hand chamber connected with said tank through an air passage duct, said central chamber being connected through said second pipe with the brakes of the vehicles, a rocking lever for mechanically coupling said brake control unit with said movable spring valve, said rocking lever being pivoted at one end to the outer end of said rod and at the other end to said movable spring valve within said container, an intermediate point on said rocking lever being pivoted to the top of said container whereby a swinging movement of said rocking lever caused by said movable spring valve causes said first valve disc to engage its valve seat by the displacement of said rod, the inner end of which causes said second valve disc to disengage from its valve seat allowing thus the passage of compressed air from the tank to the brakes of the vehicles through the air passage duct, left hand chamber and second pipe.

References Cited by the Examiner
UNITED STATES PATENTS

| | | | |
|---|---|---|---|
| 1,504,536 | 8/1924 | Anderson | 303—37 |
| 2,032,145 | 2/1936 | Nelson | 303—39 |
| 2,714,534 | 8/1955 | Keller | 303—38 |

EUGENE G. BOTZ, *Primary Examiner.*

ARTHUR L. LA POINT, *Examiner.*